United States Patent
Danjo et al.

(10) Patent No.: US 7,808,186 B2
(45) Date of Patent: Oct. 5, 2010

(54) POWER SUPPLY APPARATUS FOR ARC-GENERATING LOAD

(75) Inventors: Kenzo Danjo, Osaka (JP); Takashi Tsujii, Osaka (JP); Hiroki Morimoto, Osaka (JP)

(73) Assignee: Sansha Electric Manufacturing Company, Limited, Osaka-shi, Osaka-fu (JP)

( * ) Notice: Subject to any disclaimer, the term of this patent is extended or adjusted under 35 U.S.C. 154(b) by 373 days.

(21) Appl. No.: 12/120,463

(22) Filed: May 14, 2008

(65) Prior Publication Data
US 2008/0290808 A1 Nov. 27, 2008

(30) Foreign Application Priority Data
May 21, 2007 (JP) ............................. 2007-134059

(51) Int. Cl.
*H05B 37/02* (2006.01)
*H05B 41/16* (2006.01)

(52) U.S. Cl. ..................... 315/219; 315/200 R; 315/279

(58) Field of Classification Search ............. 315/200 R, 315/209 R, 219, 224–226, 209 M, 247, 276–277, 315/279, 287, 291, 307; 323/355, 358
See application file for complete search history.

(56) References Cited

U.S. PATENT DOCUMENTS

| 5,363,020 | A | * | 11/1994 | Chen et al. | ............... | 315/209 R |
| 5,365,152 | A | * | 11/1994 | Ozawa et al. | ................ | 315/291 |
| 5,463,287 | A | * | 10/1995 | Kurihara et al. | ............. | 315/307 |
| 6,998,791 | B2 | * | 2/2006 | Kobayashi et al. | ...... | 315/209 R |
| 7,042,161 | B1 | * | 5/2006 | Konopka | .................... | 315/119 |

FOREIGN PATENT DOCUMENTS

| JP | 2001-035682 | 2/2001 |
| JP | 2006-337512 | 12/2006 |

\* cited by examiner

*Primary Examiner*—Thuy Vinh Tran
(74) *Attorney, Agent, or Firm*—Duane Morris LLP

(57) ABSTRACT

An output of a rectifying circuit (6), which rectifies commercial AC power, is supplied to an inverter (12) through a power factor correction circuit (8). The output of the inverter (12) is voltage-transformed in a transformer (16), rectified in a rectifying circuit (18) and is applied to a xenon lamp (2). A secondary winding (22s) of a transformer (22) of an igniter (20) is connected between the rectifying circuit (18) and the xenon lamp (2) in order to generate an arc in the xenon lamp (2). A pulse generator provides a pulse for a short time period to a primary winding (22p) of the transformer (22). An auxiliary power supply (26) supplies arc-sustaining current prepared based on the commercial AC power to the junction of the rectifying circuit (18) and the secondary winding (22s) of the transformer (22).

4 Claims, 2 Drawing Sheets

POWER SUPPLY APPARATUS FOR ARC-GENERATING LOAD

This invention relates to a power supply apparatus and, more particularly, to a power supply apparatus for a load generating an arc, for example, a xenon lamp, an arc welder and an arc cutter.

BACKGROUND OF THE INVENTION

Examples of such power supply apparatus are disclosed in JP 2001-35682A and JP 2006-337512A.

A power supply apparatus disclosed in JP 2001-35682A is for use with a discharge lamp and includes a converting circuit for converting an input supply voltage to a DC voltage. The output voltage of the converting circuit is applied to a buck converter which drives the discharge lamp. In order to ignite the discharge lamp, a high voltage from the converting circuit is applied across the discharge lamp, and, once the discharge lamp is ignited, the output voltage of the converting circuit is set to a value between 1.5 times and 2.5 times the lamp voltage of the operating discharge lamp on the basis of detection of the voltage across the discharge lamp. The power supply apparatus includes also an auxiliary power supply which supplements the converting circuit for its shortage of output voltage. With this arrangement, a voltage required for igniting the discharge lamp is secured, while improving the circuit efficiency during the steady state operation of the discharge lamp.

A power supply apparatus disclosed in JP 2006-337512A, too, is used to operate a projection lamp. In this power supply apparatus, commercial AC power is rectified in a rectifying circuit, and the rectified power is supplied through a power factor correction circuit to a primary winding of a transformer forming part of a switching regulator. The projection lamp is supplied with a voltage through this switching regulator.

The power supply apparatus disclosed in JP 2001-35682A obtains the discharge lamp igniting voltage from part of the power for the discharge lamp. Therefore, the voltage control is difficult because, when an input voltage to the power supply apparatus changes, the igniting voltage also changes. A lamp, e.g. xenon lamp, having an operating voltage in the steady state of several tens of volts, requires an igniting voltage five through ten times as high as the steady state voltage, and, therefore the power supply for the steady state operation of the lamp is not useable for igniting the lamp. On the other hand, if a power supply which can generate a high voltage for sustaining arcing is used, current loss and other disadvantages occur, which results in lowering of the efficiency, because such a high voltage is not necessary for the steady state operation. As disclosed in JP 2001-35682A, an auxiliary power supply may be used to provide a high voltage, but such auxiliary power supply requires large-sized diodes having a high-withstanding voltage, which inevitably results in increase of the cost and size of the power supply apparatus. Furthermore, when an auxiliary power supply apparatus arranged as disclosed in JP 2001-35682A is used to ignite the lamp, current abruptly flows through a load when igniting the lamp, resulting in voltage decrease, which, in turn, makes the operation of the lamp unstable, possibly leading to shortening of the life of the lamp.

The power supply apparatus disclosed in JP 2006-337512A is not provided with means, e.g. a pulse transformer, for ignition, but uses one transformer during steady state operation and ignition, and, therefore components of the switching regulator including the transformer must be able to handle large power, leading to increase of cost and size of the power supply apparatus.

An object of this invention is to provide an inexpensive and small-sized power supply apparatus for a load generating an arc.

SUMMARY OF THE INVENTION

A power supply apparatus according to an aspect of the invention includes an input-side rectifier for rectifying AC power. A rectified output of the input-side rectifier is converted to a high-frequency signal in a high-frequency converter. An inverter or a chopper, for example, may be used as the high-frequency converter. The high-frequency signal from the high-frequency converter is applied to a primary winding of a transformer, and a transformed high-frequency signal is developed in a secondary winding of the transformer. The transformed high-frequency signal developed in the secondary winding of the transformer is rectified in an output-side rectifier and applied to an arc-generating load. The arc-generating load may be a xenon lamp, an arc welder and an arc cutter, for example. A secondary winding of a ignition transformer of an igniter is connected in series between the output-side rectifier and the arc-generating load. A pulse generator applies a pulse to a primary winding of the ignition transformer for a short time period. A controller controls at least the high-frequency converter. There is provided an auxiliary power supply for driving the controller. The auxiliary power supply has an auxiliary power supply transformer. An arc-sustaining secondary winding is provided in the auxiliary power supply transformer for generating current for sustaining an arc. The arc-sustaining current is supplied from the arc-sustaining secondary winding to a junction of the output-side rectifier and the ignition transformer.

In the power supply apparatus, a pulse generated in the pulse generator is voltage-transformed in the ignition transformer, and a voltage-transformed pulse is induced in the secondary winding of the ignition transformer and applied to the arc-generating load to generate an arc. At the same time, the arc-sustaining current of the auxiliary power supply at the junction of the secondary winding of the ignition transformer and the output-side rectifier is supplied via the secondary winding of the ignition transformer to the arc-generating load to sustain the arcing. After the arc is generated and sustained, the rectifier output from the input-side rectifier, as converted to a high-frequency signal in the high-frequency converter, voltage-transformed in the transformer, and rectified in the output-side rectifier, is applied to the arc-generating load.

With the above-described arrangement, the auxiliary power supply for driving the controller is taken advantage of for generating the current for sustaining the arcing, and the high-frequency converter, the transformer and the output-side rectifier are used in the steady state after the arcing is sustained. Thus, the arc-sustaining current can be provided without need for using a dedicated auxiliary power supply, and, although the required ignition voltage is high, components used in the power supply apparatus can have only such withstanding voltage that they are not damaged during the steady state operation of the power supply apparatus. Thus, the power supply apparatus can be small in size and inexpensive.

The auxiliary power supply may include an isolation transformer, which has its primary side supplied with an output of the input-side rectifier, with an output developed in the secondary side of the isolation transformer supplied to the auxiliary power supply transformer. Alternatively, the auxiliary power supply may not include an isolation transformer, but, instead, an output of the input-side rectifier may be applied to the auxiliary power supply transformer.

The auxiliary power supply may include an isolation transformer, which has its primary side supplied with the AC power, with an output developed in the secondary side of the isolation transformer supplied to the auxiliary power supply transformer. Alternatively, the auxiliary power supply may not include an isolation transformer, but, instead, an output of the input-side rectifier may be applied to the auxiliary power supply transformer.

In any of the above-described arrangements, a rectifier and a smoother may be used in the auxiliary power supply transformer, or the auxiliary power supply may be used to form a switching regulator. When such switching regulator is used, constant current control may be employed in order to maintain the arc-sustaining current constant at a predetermined value.

BEST MODE FOR CARRYING OUT THE INVENTION

Figure 1:
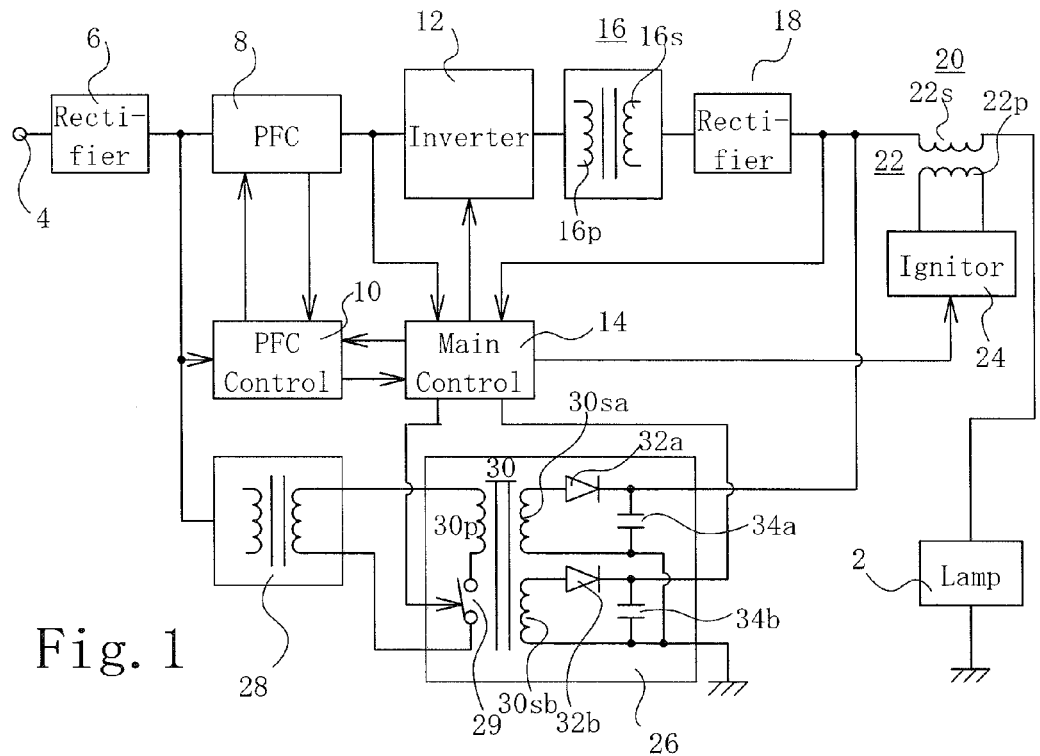
FIG. 1 is a block circuit diagram of a power supply apparatus according to a first embodiment of the present invention.

As shown in FIG. 1, a power supply apparatus according to a first embodiment of the present invention is used to supply DC power to a load, for example, a xenon lamp 2 to turn on and drive it to emit light. The power supply apparatus has a power supply input terminal 4. In FIGS. 1 through 4, one input terminal 4 is shown, but, actually, two or three input terminals 4 are provided for the power supply apparatus. An AC power supply, e.g. a commercial AC power supply providing a voltage of 200-240 V, is connected to the input terminal 4. Either single-phase or three-phase commercial AC power supply is used. An AC voltage from the commercial AC power supply is rectified in an input-side rectifier, e.g. a rectifying circuit 6, which is either a full-wave rectifying circuit or a half-wave rectifying circuit. A rectified output from the rectifying circuit 6 is applied to a power factor correction (PFC) circuit 8. The PFC circuit 8 is controlled by a PFC control circuit 10 in such a manner that the power factor as viewed from the AC power supply side is corrected. To achieve such control, a detection signal representing a voltage or current of the PFC circuit 8 is supplied to the PFC control circuit 10. Circuit arrangements of the PFC circuit 8 and the PFC control circuit 10 are known, and their detailed description is not given here.

The output of the PFC circuit 8 is applied to a high-frequency converter, e.g. an inverter 12. The inverter 12 is controlled by a controller, e.g. a main control circuit 14, and converts the output signal of the PFC circuit 8 to a high-frequency signal. The inverter 12 includes a plurality of semiconductor switching devices, e.g. IGBTs, which are controlled by the main control circuit 14. Various known types of inverters may be used as the inverter 12.

The high-frequency signal output from the inverter 12 is applied to a primary winding 16$p$ of a transformer, e.g. an isolation transformer 16. The isolation transformer 16 has a secondary winding 16$s$, too. The winding ratio of the secondary winding 16$s$ to the primary winding 16$p$ is so selected that the voltage induced in the secondary winding 16$s$ can be lower than the voltage applied to the primary winding 16$p$. The voltage-transformed high-frequency signal induced in the secondary winding 16$s$ of the transformer 16 is rectified in an output-side rectifier, e.g. a rectifying circuit 18. Either a full-wave rectifying circuit or a half-wave rectifying circuit is used as the rectifying circuit 18. The output of the rectifying circuit 18 is applied to one electrode of the xenon lamp 2. The other electrode of the xenon lamp 2 is connected to a point of reference potential, e.g. ground potential. Although not shown, current flowing through the xenon lamp 2 returns to the secondary winding 16$s$. The output voltage of the rectifying circuit 18 is generally from 10 V to 20 V.

In the steady state where the xenon lamp 2 has been ignited to arc and is emitting light, the main control circuit 14 is supplied with signals respectively representing the input voltage to the inverter 12 and the input current to the xenon lamp 2. In accordance with these signals, the main control circuit 14 performs constant-current control of the inverter 12 such that the load current to the xenon lamp 2 can be constant, or constant-power control of the inverter 12 such that the load power can be constant. The main control circuit 14 is driven from an auxiliary power supply 26 described later, which operates also as the power supply for other controllers including the PFC control circuit 10.

The output signal of the rectifying circuit 18 simply applied to the xenon lamp 2 cannot ignite the xenon lamp 2. It is first necessary to generate an arc in the xenon lamp 2. For that purpose, an igniting device, e.g. an igniter 20 is connected between the output of the rectifying circuit 18 and a first electrode of the xenon lamp 2.

The igniter 20 includes an ignition transformer, e.g. a pulse transformer 22. A secondary winding 22$s$ of the pulse transformer 22 is connected in series between the output of the rectifying circuit 18 and the first electrode of the xenon lamp 2. A pulse generator, e.g. an igniting circuit 24, is connected to a primary winding 22$p$ of the pulse transformer 22. The igniting circuit 24 generates a pulse voltage during a predetermined ignition period in accordance with a command given by the main control circuit 14. The winding ratio of the secondary winding 22$s$ to the primary winding 22$p$ is selected to be large. Accordingly, the pulse voltage applied from the igniting circuit 24 to the primary winding 22$p$ causes a largely raised pulse voltage to be induced in the secondary winding 22$s$. This large pulse voltage is applied to the xenon lamp 2 and causes an arc to be generated in the xenon lamp 2, causing arc current to flow.

According to the first embodiment, the auxiliary power supply 26 is utilized to sustain the arc current. As previously described, the auxiliary power supply 26 is essentially used to drive various control circuits including the main control circuit 14. The auxiliary power supply 26 includes a transformer 30, which has its primary winding 30$p$ supplied with the output voltage of the rectifying circuit 6 lowered in an isolation transformer 28. Specifically, the isolation transformer 28 has a primary winding 28$p$ and a secondary winding 28$s$, and the output voltage of the rectifying circuit 6 is applied to the primary winding 28$p$. A voltage resulting from lowering the output voltage of the rectifying circuit 6 is induced in the secondary winding 28$s$, and this lowered voltage in the secondary winding 28$s$ is applied to the primary winding 30$p$ of the transformer 30 through a switch 29. The switch 29 is formed by semiconductor switching devices, e.g. IGBTs, and controlled by the main control circuit 14. For example, at the time when the igniting circuit 24 generates a pulse voltage, the switch 29 has been already closed in response to a command given by the main control circuit 14. The transformer 30 has two secondary windings 30sa and 30sb, and voltages induced in the secondary windings 30sa and 30sb are respectively rectified by rectifiers, e.g. diodes 32a and 32b and smoothed by smoothers, e.g. capacitors 34a and 34b. A smoothed voltage from the capacitor 34a is applied to a junction of the rectifying circuit 18 and one terminal of the secondary winding 22s of the transformer 22. This smoothed voltage provides the arc sustaining current for the xenon lamp 2. The smoothed voltage is about 150 V, for example. By virtue of the sustained flow of the arc current, the xenon lamp 2 is operated to emit light. As described above, once the xenon lamp 2 is operated to emit light, current is supplied from the rectifying circuit 18 to the xenon lamp 2 so that the xenon lamp 2 can sustain its emission of light.

The voltage induced in the capacitor 34b is supplied to the main control circuit 14 as its operating voltage. Like this, by adding the arc-sustaining secondary winding 30sa to the power supply for providing a constant voltage for the main control circuit 14, a stable operating voltage can be provided for sustaining arcing.

After an arc is generated in the xenon lamp 2, the current for sustaining the arcing is provided by the auxiliary power supply 26, and therefore the burden on the inverter 12 is light. Without the auxiliary power supply 26, the current for sustaining the arcing should be provided solely by the inverter 12, and, for that purpose, the inverter 12 should be formed by semiconductor switching devices capable of handling large power. Also, since the inverter 12 need not handle large power when keeping the xenon lamp 2 operating in the steady state, such large meter 12 would be only for sustaining the arc immediately after it is generated. According to this embodiment, on the other hand, the inverter 12 can be of a simple structure and can be a low-power handling inverter which only needs to provide power required in the steady state, since the transformer 30 of the auxiliary power supply 26 is utilized. Thus, the power supply apparatus according to this embodiment can be manufactured at low cost and can be small-sized, accordingly. Furthermore, at the time when the igniter 20 generates an arc in the xenon lamp 2, the auxiliary power supply 26 is ready to supply arc current, and therefore arc-sustaining current is immediately supplied to the xenon lamp 2 from the auxiliary power supply 26. This can shorten the time period required for placing the xenon lamp 2 in its steady state to emit light. Also, since the output of the auxiliary power supply 26 is PFC controlled, a constant voltage can be provided, and therefore stable lamp arcing is possible.

Figure 2:
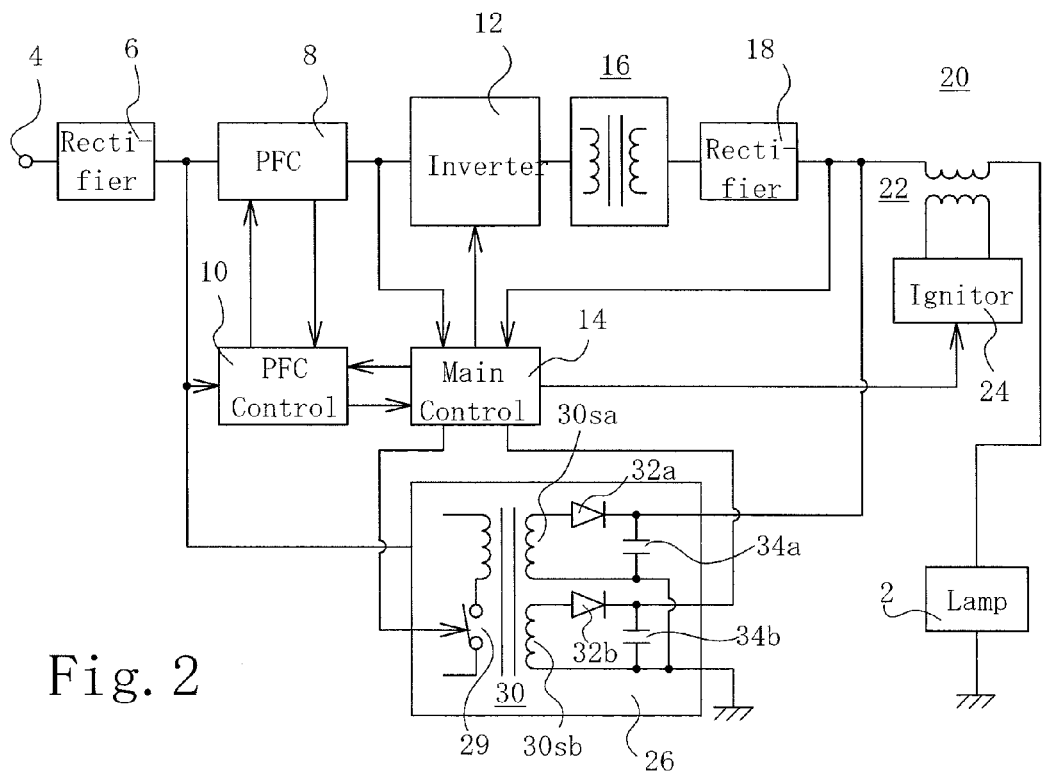
FIG. 2 is a block circuit diagram of a power supply apparatus according to a second embodiment of the present invention.

A power supply apparatus according to a second embodiment is shown in FIG. 2. The power supply apparatus according to the second embodiment has the same arrangement as the power supply apparatus according to the first embodiment, except that the isolation transformer 28 is eliminated and that the output of the rectifying circuit 6 is directly applied to the transformer 30 of the auxiliary power supply 26. It should be noted, however, that the winding ratio employed is different from that of the transformer 30 of the first embodiment. The same reference numerals and symbols as used in FIG. 1 denote the same components and/or functions, and, therefore no further description about them is given. Because of the elimination of the isolation transformer 28, the structure of the power supply apparatus is further simplified.

Figure 3:
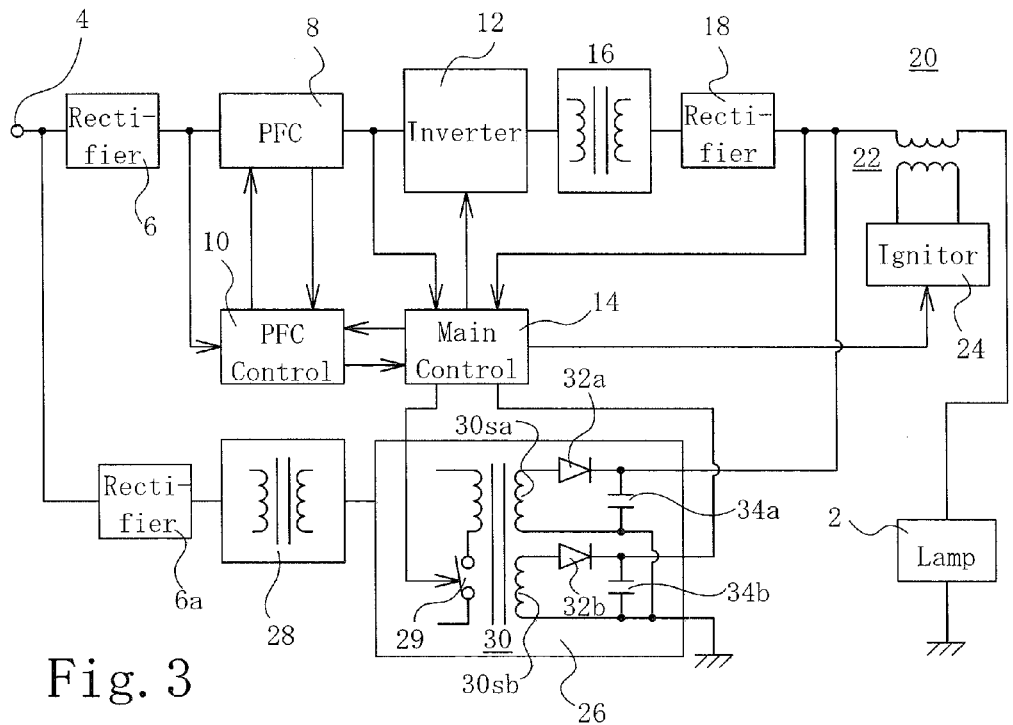
FIG. 3 is a block circuit diagram of a power supply apparatus according to a third embodiment of the present invention.

A power supply apparatus according to a third embodiment is shown in FIG. 3. The power supply apparatus according to the third embodiment has the same arrangement as the power supply apparatus according to the first embodiment, except that it is not the output of the rectifying circuit, but the output of a rectifying circuit 6a dedicated for the auxiliary power supply 26, which rectifies the commercial AC voltage applied to it, is voltage-transformed in the isolation transformer 28. The same reference numerals and symbols as used in FIG. 1 denote the same components and/or functions, and, therefore no further description about them is given. With this arrangement, current flowing through the rectifying circuit 6 can be smaller, so that the rectifying circuit 6 can be small, resulting in a smaller power supply apparatus.

Figure 4:
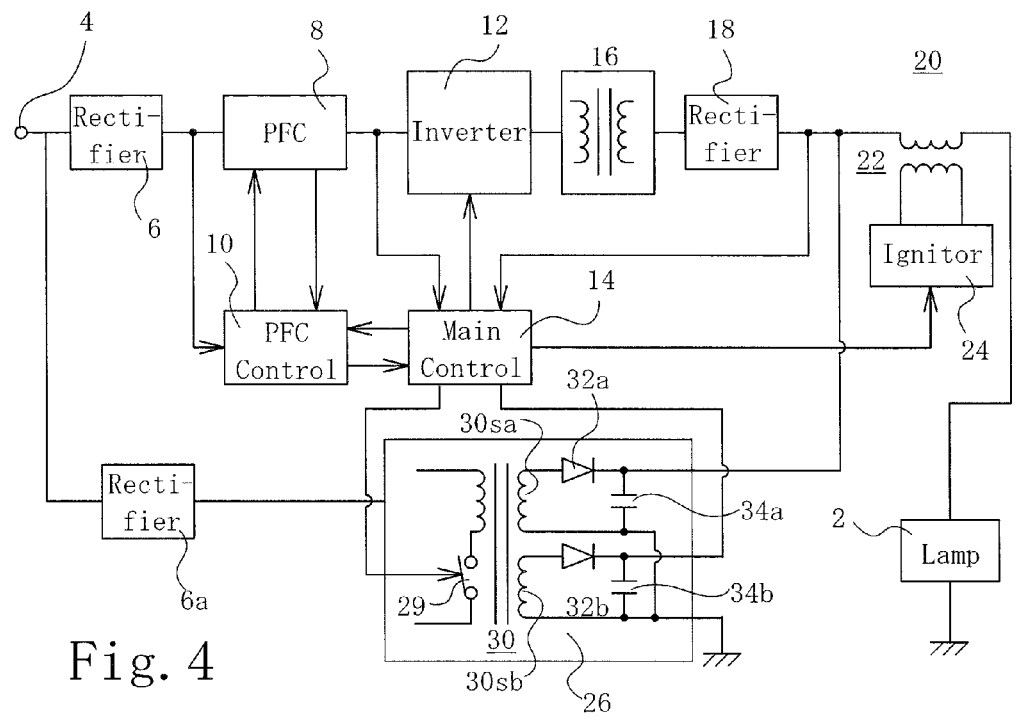
FIG. 4 is a block circuit diagram of a power supply apparatus according to a fourth embodiment of the present invention.

A power supply apparatus according to a fourth embodiment is shown in FIG. 4. The power supply apparatus according to the fourth embodiment has the same arrangement as the power supply apparatus according to the third embodiment, except that the isolation transformer 28 is not used and that the output of the rectifying circuit 6a is directly applied to the transformer 30 of the auxiliary power supply 26. The same reference numerals and symbols as used in FIG. 3 denote the same components and/or functions, and, therefore no further description about them is given. With this arrangement, since the isolation transformer 28 is eliminated, the structure of the power supply apparatus is further simplified.

The present invention has been described, being embodied in power supply apparatuses for a xenon lamp. However, the invention is not limited to such power supply apparatuses, but it can be embodied in power supply apparatuses for any arc-generating loads, such as an arc-welder and an arc cutter.

In the described embodiments, the PFC (power factor correction) circuit 8 is used, but, in place of the PFC circuit, commonly used smoothing means, e.g. a smoothing capacitor, may be used. Also, in the described embodiments, the inverter 12 is used as high-frequency converting means, but the inverter 12 is not limited to it. Other means including a chopper may be used instead.

In the described embodiments, the switch 29 is maintained closed after a command is given to it from the main control circuit 14. However, the switch 29 may be alternately opened and closed to provide a switching regulator together with the transformer 30, the diode 32a and the capacitor 34a.

What is claimed is:

1. A power supply apparatus for an arc-generating load, comprising:
    an input-side rectifier adapted for connection to an AC power supply;
    a high-frequency converter for converting an output of said input-side rectifier to a high-frequency signal;
    a transformer having a primary winding receiving the high-frequency signal from said high-frequency converter and having a secondary winding in which a voltage-transformed version of said high-frequency signal is developed;
    an output-side rectifier for rectifying the voltage-transformed high-frequency signal from the secondary winding of said transformer for application to said arc-generating load;
    an igniter including an ignition transformer, said ignition transformer having a secondary winding having one end connected to said output-side rectifier and having the other end adapted for connection to said arc-generating load and having a primary winding in which a pulse is supplied for a short time period from a pulse generator;
    a controller for controlling at least said high-frequency converter; and an auxiliary power supply for driving said controller;

said auxiliary power supply including an auxiliary power supply transformer, said auxiliary power supply transformer being provided with an arc-sustaining secondary winding for providing arc-sustaining current, the arc-sustaining current being supplied from said arc-sustaining secondary winding to a junction of said output-side rectifier and said secondary winding of said ignition transformer.

2. The power supply apparatus according to claim 1, wherein said auxiliary power supply includes an isolation transformer having a primary winding supplied with the output of said input-side rectifier, an output developed in a secondary winding of said isolation transformer being supplied to said auxiliary power supply transformer.

3. The power supply apparatus according to claim 1, wherein said auxiliary power supply transformer is supplied with the output of said input-side rectifier.

4. The power supply apparatus according to claim 1, wherein said auxiliary power supply includes an isolation transformer having a primary winding to which AC power is supplied from said AC power supply, an output developed in a secondary winding of said isolation transformer being supplied to said auxiliary power supply transformer.

* * * * *